:a (12) United States Patent
Pierce et al.

(10) Patent No.: US 8,793,705 B2
(45) Date of Patent: Jul. 29, 2014

(54) RICH INTERNET BUS

(75) Inventors: Darryl L. Pierce, Apex, NC (US); Norman Lee Faus, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 872 days.

(21) Appl. No.: 11/849,121

(22) Filed: Aug. 31, 2007

(65) Prior Publication Data

US 2009/0064191 A1    Mar. 5, 2009

(51) Int. Cl.
*G06F 3/00* (2006.01)
*G06F 9/54* (2006.01)

(52) U.S. Cl.
CPC ............... *G06F 9/546* (2013.01); *G06F 9/542* (2013.01)
USPC .......................................... 719/318; 719/313

(58) Field of Classification Search
CPC .................................. G06F 9/456; G06F 9/542
USPC .......................................... 719/318, 310, 313
See application file for complete search history.

(56) References Cited

U.S. PATENT DOCUMENTS

| | | | |
|---|---|---|---|
| 6,366,926 B1 * | 4/2002 | Pohlmann et al. | 707/104.1 |
| 6,438,618 B1 * | 8/2002 | Lortz et al. | 719/318 |
| 6,654,815 B1 * | 11/2003 | Goss et al. | 709/248 |
| 6,785,708 B1 * | 8/2004 | Busey et al. | 709/204 |
| 7,072,984 B1 * | 7/2006 | Polonsky et al. | 709/246 |
| 7,080,120 B2 * | 7/2006 | Betros et al. | 709/205 |
| 2002/0065752 A1 * | 5/2002 | Lewis | 705/35 |
| 2002/0157017 A1 * | 10/2002 | Mi et al. | 713/200 |
| 2002/0188862 A1 * | 12/2002 | Trethewey et al. | 713/201 |
| 2003/0115122 A1 * | 6/2003 | Slater et al. | 705/35 |
| 2003/0173403 A1 * | 9/2003 | Vogler | 235/385 |
| 2004/0012626 A1 * | 1/2004 | Brookins | 345/738 |
| 2005/0108418 A1 * | 5/2005 | Bedi et al. | 709/232 |
| 2006/0149787 A1 * | 7/2006 | Surlaker et al. | 707/200 |
| 2006/0173749 A1 * | 8/2006 | Ward et al. | 705/26 |
| 2007/0192326 A1 * | 8/2007 | Angal et al. | 707/10 |
| 2008/0098406 A1 * | 4/2008 | Quick et al. | 719/314 |

OTHER PUBLICATIONS

S M Thompson and DE sheat, Exploiting Telecommunication to Deliver Real Transport Information, Apr. 1998.*

* cited by examiner

*Primary Examiner* — Lechi Truong
(74) *Attorney, Agent, or Firm* — Lowenstein Sandler LLP (57) ABSTRACT

An embodiment relates generally to a method of updating data. The method includes providing for a plurality of components, where each component is associated with a respective web page. The method also includes providing for a subset of components from the plurality of components, where the subset of components subscribes to an event. The method further includes publishing a notification message in response to the event occurring and retrieving the event by the subset of components.

12 Claims, 5 Drawing Sheets

RICH INTERNET BUS

FIELD

This invention relates generally to messaging, more particularly, to systems and methods for providing a rich Internet bus.

DESCRIPTION OF THE RELATED ART

Web pages are generally well known. A Web page can be a simple text file that contains not only text, but also a set of HTML tags that describe how the text should be formatted when a browser displays it on the screen. The tags are simple instructions that tell the Web browser how the page should look when it is displayed. The tags tell the browser to do things like change the font size or color, or arrange things in columns. The Web browser interprets these tags to decide how to format the text onto the screen.

Web pages have become popular as interfaces for complex computer systems because of their simplicity and ease. For instance, a product ordering system can use web page technology to implement their graphical user interfaces. An inventory module can use web pages as an interface to monitor and manage inventory. Similarly, a customer interface module of the product ordering system can use web pages to interact with the user to browse for products and to purchase the same. The ease and flexibility of web pages make generating the interfaces a very quick process.

Moreover, in complex systems, different modules may depend on a state of data objects. Continuing with the product ordering system example, a customer can purchase a selected product through a customer interface of the product ordering system. The purchase of the product can be referred to as a purchase data object. The data object can contain the information associated with the selected product such as a SKU number, the quantity purchased, a user name, and the like. An inventory module would like to know about this purchase data object to update the inventory for the selected product. A shipping module may be interested in the purchase data object to calculate shipping charges. A customer relationship module ("CRM") may also be interested to track the history of the purchases of the user.

The update of the purchase data object to any interested modules are typically "hard-wired", i.e., the data paths to the interested modules for the purchase data object are hard coded. These complex systems can work efficiently. However, if there are any changes within the data paths, the work involved to locate and change the data paths within a complex system can become overwhelmingly burdensome.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for updating respective components of disparate web pages. More particularly, a rich Internet bus can be configured to provide a communication channel to update or pass information between the components of separate web pages. The rich Internet bus can be coupled to a manager module that is configured to maintain a repository of topics, where a component can subscribe to any topic of interest. Accordingly, a component can receive the associated event when it publishes on the rich Internet bus. Components as used herein can be defined as a data object that is mutable and may be dependent on other data objects and/or a third party event. One example of a component is a shopping cart function on a web page.

As such, a component of a web page can subscribe for at least one event. The event can occur and is published to the rich Internet bus. The event can be temporarily stored in the manager module. The manager module can be configured to maintain a list of subscribing components for each topic. The manager module can then be configured to publish a notification message that the publishing event has occurred to the rich Internet bus. The subscribing component(s) for the topic associated with the event can detect the notification message and prepare for receiving the event Subsequently, the manager module can the forward the event to the subscribing component(s).

For example, an inventory tracking component of an inventory web page can subscribe to a purchase event when a shopping cart of a user is submitted for purchasing. The shopping cart component can publish the purchasing event to the manager module. The manager module can then publish a notification message that the purchasing event has occurred. The components that subscribed to the publication event can detect the notification message on the rich Internet bus. The manager module can then forward the buffered event to each subscribing component.

Accordingly, components of disparate web pages can receive information and update their respective components without hardwiring the data transfer paths as in conventional systems.

Figure 1:
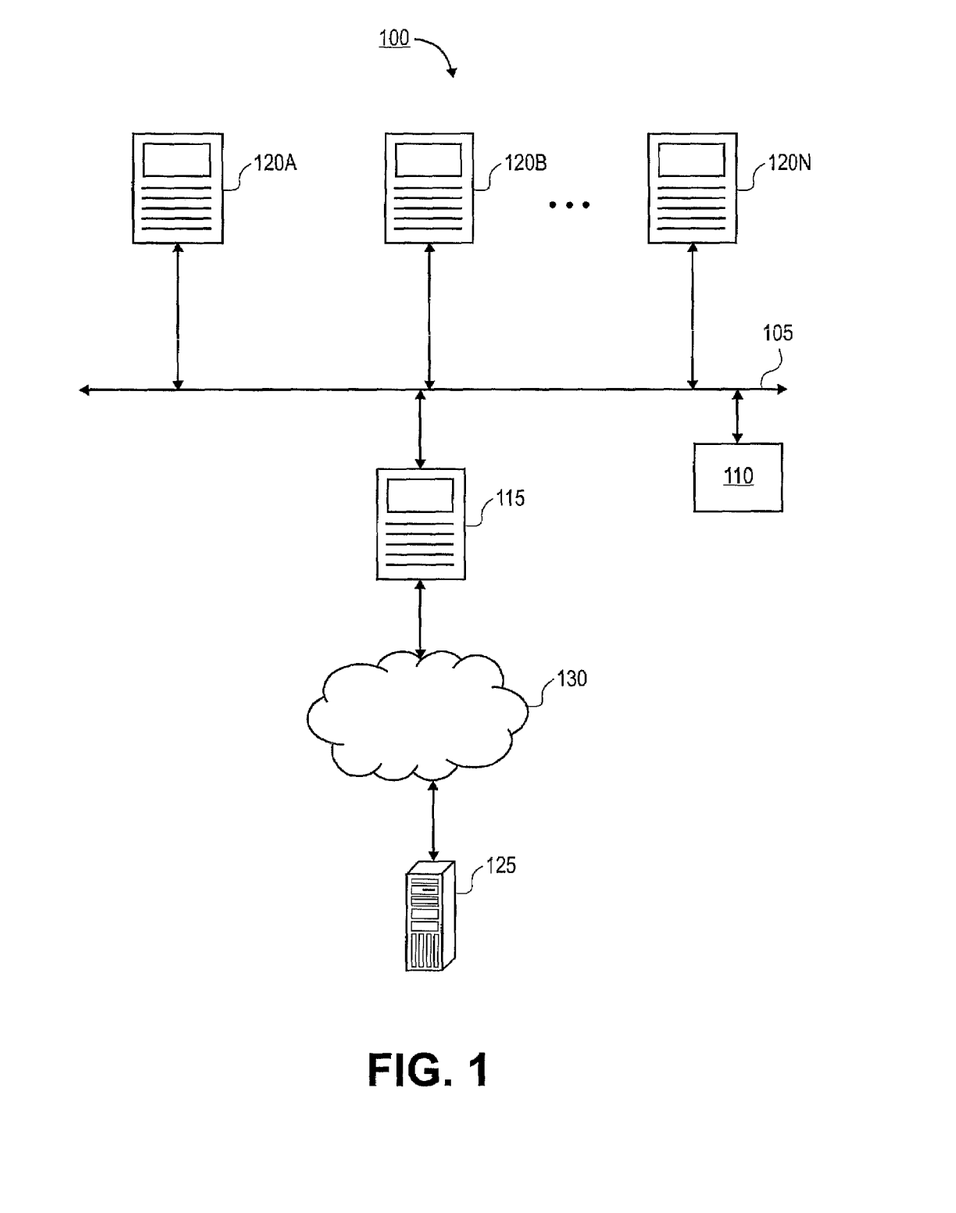
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 can comprise a message bus 105, a manager module 110, an application web page 115, and web pages 120A-N. The message bus 105 can be configured to provide a communication channel for the application web page 115 and web pages 120A-N to exchange data.

The message bus 105 can be coupled to the manager module 110. The manager module 110 can be configured to manage and monitor the message bus 105. The manager module 110 can also be configured to maintain a data structure that contains a list of topics that the application web page 115 and web pages 120A-N can subscribe thereto. The manager module 110 can be further configured to buffer events from the application web page 115 and web pages 120A-N and broadcast notification messages in response to receiving the events.

The application web page 115 and the web pages 120A-N can be coupled to the message bus 115. More particularly, the application web page 115 and the web pages 120A-N can comprise at least one component. The component(s) can be a data object that is mutable and may be dependent on other data objects and/or a third party event. The component(s) of the application web page 115 can be coupled to the message bus 105 and subscribe to a selected topic. Each topic may have an associated event. The selection of the topic can be dependent on the function of the subscribing component. For example, an inventory component of a web page 120A can subscribe to a product purchase event conducted by a shopping cart component on the application web page 115. In some embodiments, a component can subscribe to more than one topic.

The components of the web pages 115, 120A-N can also be configured to publish events. More specifically, when a component is changed, the component can publish the event to the message bus 105

The web pages 120A-N can be separate or disparate web pages. For example, web page 120A can be a inventory web page with inventory associated component(s) and web page 120B can be user profile web page with user profile associated component(s).

The application web page 115 can comprise a client side browser that comprises at least one browser side component and at least one server side component, which is instantiated on the server 125. More particularly, a user can log-in to the server 125 and instantiate a browser instance. The browser instance can have a client side, which provides a mechanism for a user to interact and a server side, which can provide server side processing to implement the functions of the application web page 115 such as retrieving data from databases to populate a product browse function.

The application web page 115 can be remote from the server 125. A network 130 such as the Internet can provide the communication channel between a user executing the application web page 115 and the server 125 at a remote location.

Accordingly, when a component on any of the web pages 115, 120A-N is changed, the respective component can publish the event to the message bus 105. The manager module 110 can buffer the event temporarily and broadcast an associated notification message on the message bus 105. Subscribing components that have subscribed to the topic associated with the event can detect the associated notification message and prepare to receive the event. Subsequently, the manager module 110 can forward the event to the components subscribing to the topic associated with the event. In some embodiments, the manager module 110 can maintain lists of subscribers for each topic.

Figure 2A:
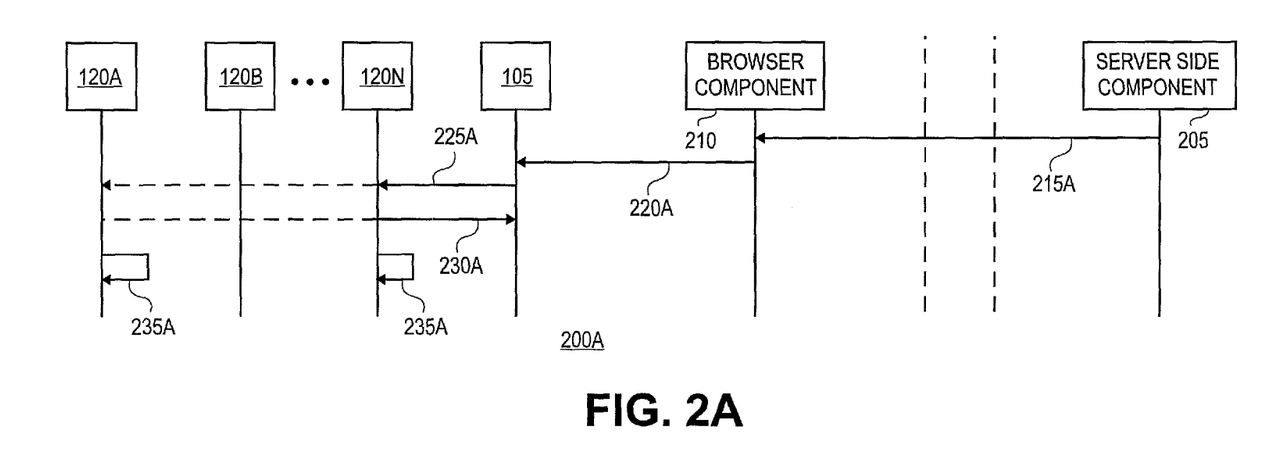
FIGS. 2A-C collectively illustrate exemplary process flows executed in the system shown in FIG. 1 in accordance with another embodiment.
Figure 2B:
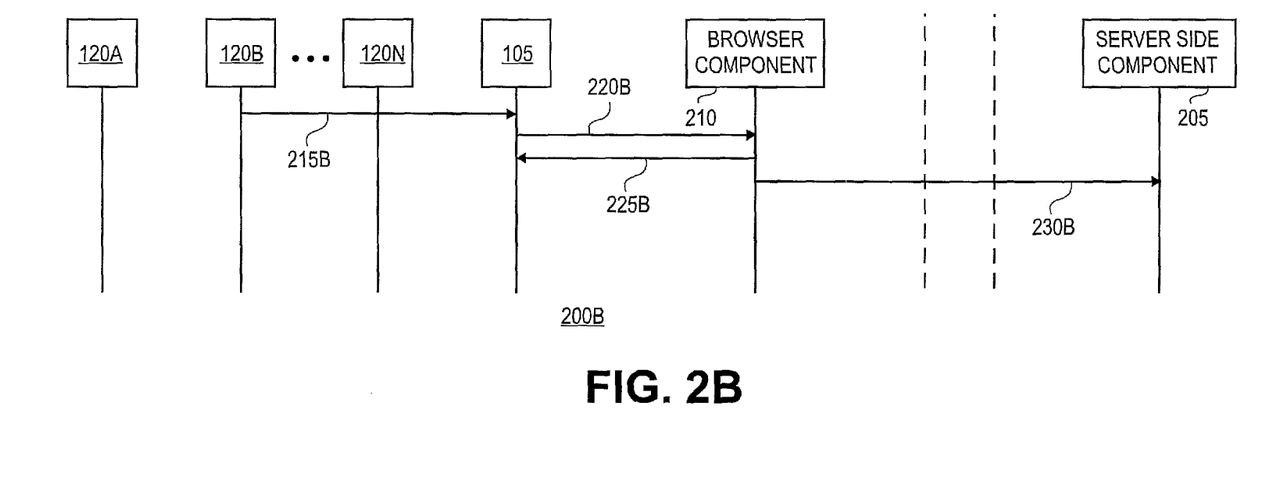
Figure 2C:
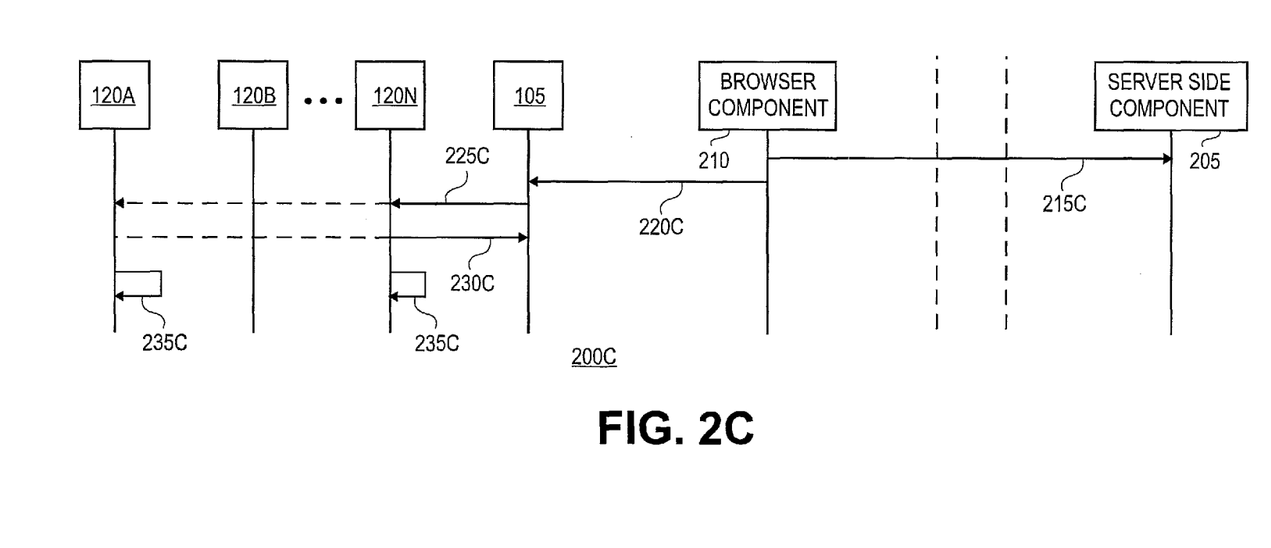

FIGS. 2A-C illustrate, respectively, exemplary process flows in accordance with another embodiment. FIGS. 2A-C share common elements. Accordingly, the description of the common features in FIGS. 2BC are omitted and the descriptions of these feature with respect to FIG. 2A are being relied upon to provide adequate descriptions of the common features.

FIG. 2A depicts a server side event publishing process flow 200A. The process flow includes a server side component 205, a browser component 210, the message bus 105, and web pages 120A-N. The server side component 205 and browser component 210 can be part of a browser instance displaying the application page 115 from the server 125.

In step 215A, the server side component 205 can publish an event to the browser component 210. More specifically, a server event has occurred and the server 130 has updated the server side component 205. For example, a vendor may have updated the price of his respective product. Accordingly, a price change event has occurred in the server side component 205A, which is then updated to the browser component 210.

In step 220A, the browser component 210 can update itself based on the data contained in the event. The browser component can then publish the event to the message bus 105, which stores the event and broadcasts an associated notification message on the message bus 105.

In step 225A, at least one component of web pages 125A and 125N have subscribed to the topic associated with the issue event. Accordingly, the respective components of the web pages 125A, 125N can detect the desired notification message.

In step 230A, each component of the web pages 120A, 120N can then receive the event from the manager module 110. In step 235A, each component of the web pages 125A, 125N can update themselves with the data contained in the event.

FIG. 2B illustrates a process flow 200B of a component of a web page publishing an event. For illustrative purposes only, a component on web page 120B has an occurring event. In step 215B, the component can publish the event to the message bus 105. The manager module 110 can store the published event and broadcast an associated notification message to the subscribing component(s). For this example, the browser component 210 can subscribe to the topic associated with this published event.

In step 220B, the browser component 210 can detect the associated notification message. In step 225B, the browser component 210 can receive the event from the manager module 110 and update itself with the data contained in the received event. In step 230B, the browser component 210 can then update the server side component 205.

FIG. 2C depicts a process flow 200C of the browser component 210 publishing an event. For illustrative purposes, the web pages 120A, 120N subscribe to the topic associated with the event being published from the browser component 210.

In step 215C, an event has occurred in the browser component 210 and the browser component 210 can then update the server side component 205. For example, a user may have added an item to a shopping cart.

In step 220C, the browser component can be configured to publish the event to the message bus 105. The manager module 110 can buffer the published event. The manager module 110 can be configured to determine the associated notification message associated with the event and publish the associated notification message to the subscribing component(s) over the message bus 105.

In step 225C, the respective components of web pages 120A, 120N can detect the associated notification message. In step 230C, the respective components of web pages 120A, 120N can receive the published event from the manager module 110.

In step 235C, the respective components of web pages 120A, 120N update themselves with the data contained in the event.

Figure 3:
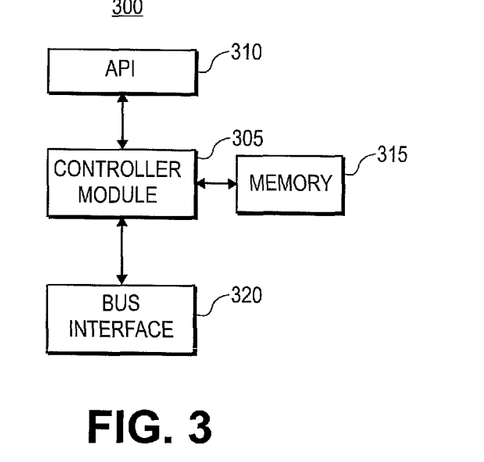
FIG. 3 depicts an exemplary block diagram in accordance with yet another embodiment.

FIG. 3 illustrates an exemplary block diagram of a component interface 300 in accordance with yet another embodiment. It should be readily apparent to those of ordinary skill in the art that the component interface 300 depicted in FIG. 3 represents a generalized schematic illustration and that other components may be added or existing components may be removed or modified. Moreover, the component interface 300 may be implemented using software components, hardware components, or combinations thereof.

As shown in FIG. 3, the component interface 300 can comprise a controller module 305, an application program interface (labeled as "API") 310, a memory 315, and a bus interface 320. The controller module 305 can be configured to manage and to interface with modules 310-320 to provide the functionality of the component interface 300. The controller module 305 can be configured to subscribe to a selected topic and monitor for the associated notification messages. The controller module 305 can also be configured to retrieve published events from the manager module 110.

The API 310 can be an interface between the controller module 305 and the component of a web page. The API 310 can pass data associated with a received event to the component for updating. The API 310 can also receive events from the component to publish to the message bus 105.

The memory 315 can be coupled to the controller module 305. The memory 315 can provide storage for data being processed by the controller module 305.

The bus interface 320 can be coupled to the controller module 305 and to the message bus 105. The bus interface 320 can be configured to provide an interface between the message bus 105 and the controller 305. The bus interface 320 can reformat any received notification messages and events to a native format that can be processed by the controller module 305.

Figure 4:
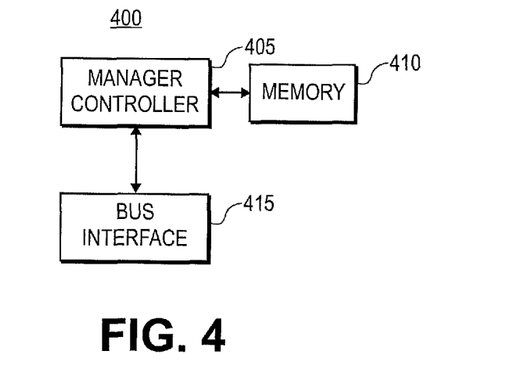
FIG. 4 illustrates another exemplary detailed block diagram in accordance with yet another embodiment.

FIG. 4 illustrates an exemplary block diagram of the manager module 110 in accordance with yet another embodiment. It should be readily apparent to those of ordinary skill in the art that the manager module 110 depicted in FIG. 4 represents a generalized schematic illustration and that other components may be added or existing components may be removed or modified. Moreover, the manager module 110 may be implemented using software components, hardware components, or combinations thereof.

As shown in FIG. 4, the manager module 110 can comprise of a manager controller 405, a memory 410, and a bus interface 415. The manager controller 405 can be configured to manage and to interface with modules 410-415 to provide the functionality of the manager module 110. The manager controller 405 can be configured to maintain a list of topics that components can subscribe thereto. The manager controller 405 can also maintain lists of subscribing components for each topic. The manager controller 405 can be further configured to monitor for published events on the message bus 105 and to broadcast the associated notification messages.

The memory 410 can be coupled to the manager controller 405. The memory 410 can provide storage for data being processed by the manager controller 405. The memory 410 can store the list of topics as well as to buffer any published events.

The bus interface 415 can be coupled to the manager controller 405 and to the message bus 105. The bus interface 415 can be configured to provide an interface between the message bus 105 and the manager controller 405. The bus interface 415 can reformat any received notification messages and events to a native format that can be processed by the manager controller 405.

Figure 5:
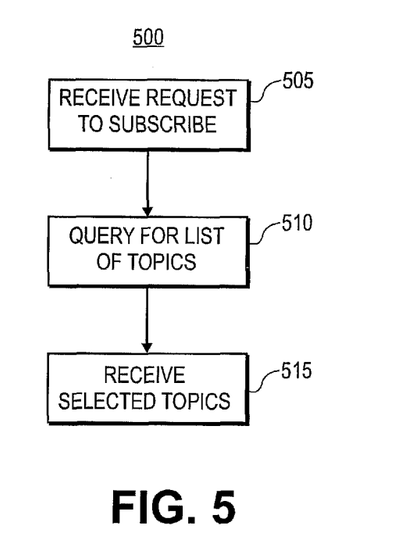
FIG. 5 depicts an exemplary flow diagram in accordance with yet another embodiment.

FIG. 5 depicts an exemplary subscription flow diagram 500 in accordance with yet another embodiment. It should be readily apparent to those of ordinary skill in the art that the flow diagram 500 depicted in FIG. 5 represents a generalized schematic illustration and that other steps may be added or existing steps may be removed or modified As shown in FIG. 5, the controller module 305 can receive a request to subscribe to a topic from a component, in step 505. The controller module 305 can query the manager module 110 for the list of topics, in step 510.

In step 515, the controller module 305 can receive a selection of topics. The controller 305 can store the selected topics in the memory 315. In some embodiments, the controller module 305 can notify the manager module 110 of the selected topics being subscribed. Subsequently, the manger module 110 can add the subscribing component to a respective list of subscribing components for the selected topic. The list of subscribing users can be implemented as a searchable data structure such as a linked list or database.

Figure 6:
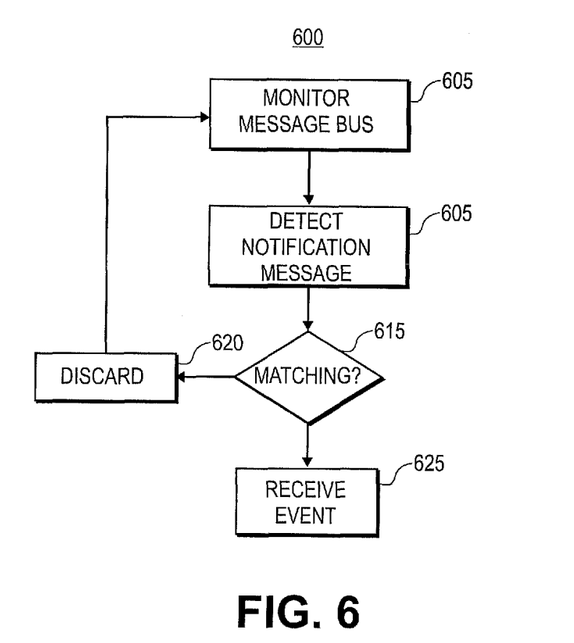
FIG. 6 illustrates another exemplary flow diagram in accordance with yet another embodiment.

FIG. 6 illustrates an exemplary monitor flow diagram 600 implemented by the component interface 300 in accordance with yet another embodiment. As shown in FIG. 6, the controller module 305 can be configured to monitor the message bus 105 for any notification messages, in step 605.

In step 610, the controller module 305 detects a notification message and can buffer the received notification message in the memory 315. In step 615, the controller module 305 can compare with the received notification message with the subscribed topics. If the received notification message does not match with any of the subscribed topics, the received notification message is discarded, in step 620. Otherwise, if the received notification message matches a subscribed topic, the controller module 305 can allocate storage space for the published event in the memory 315 to store the received event, in step 625.

Figure 7:
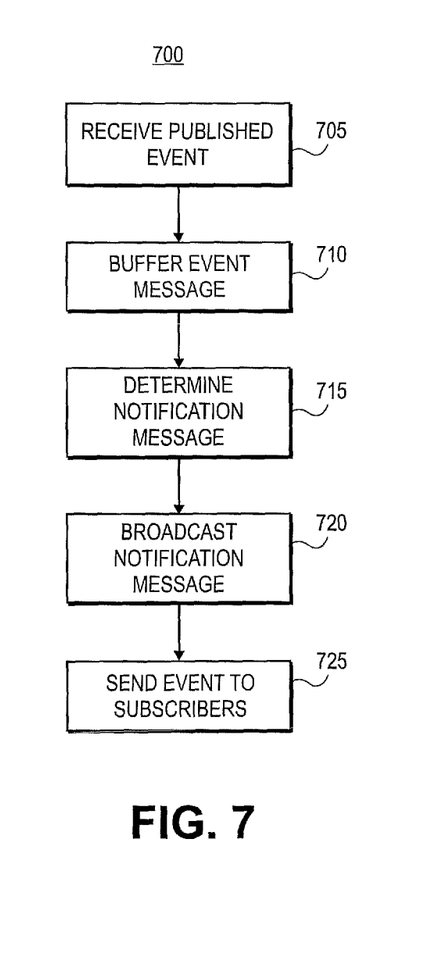
FIG. 7 depicts yet another exemplary flow diagram in accordance with yet another embodiment.

FIG. 7 depicts an exemplary monitor flow diagram 700 implemented by the manager module 110 in accordance with yet another embodiment. As shown in FIG. 7, the manager controller 405 can be configured to receive a published event from message bus 105, in step 705. More specifically, the manager controller 405 can monitor the message bus 105 for any published events. As events are published to the message bus 105, the bus interface 415 can detect the presence of the published event.

In step 710, the manager controller 405 can buffer the published event in the memory 410. In step 715, the manager controller 405 can then determine the associated notification message for the published event. In step 720, the manager controller 405 can then broadcast the associated notification message on the message bus 105.

In step 725, the manager controller 405 can retrieve the subscribing components from the list of subscribing components for the topic associated with the event. The manager controller 405 can forward the event to the subscribing components.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
  subscribing, by a computer system, a browser component of a first web page to a topic of a plurality of topics, wherein the first web page is generated by a server running a server side component associated with the first web page, and wherein the browser component is a mutable data object on the first web page;
  receiving, by the computer system and via a message bus, an event that has been published to the topic by a data object of a second web page, wherein the second web page is not generated by the server, the event comprising data that reflects a change of the data object and having an event type that is associated with the topic;
  sending, by the computer system and via the message bus, a notification message for the event to subscribers of the topic, including sending the notification message to the browser component, wherein the notification message causes at least one of the browser component or the server side component to prepare for receipt of the event, and wherein the browser component is to monitor the message bus for the notification message associated with the event; and
  subsequently providing, by the computer system, the event to the browser component of the first web page via the message bus, wherein the event causes the server side component to be updated.

2. The method of claim 1, further comprising temporarily buffering the event.

3. The method of claim 1, further comprising:
  maintaining a list of the plurality of topics, wherein each of the plurality of topics is associated with one of a plurality of event types published over the message bus.

4. A system comprising:
  a message bus;
  a first web page comprising a browser component, the first web page being generated by a server running a server side component associated with the first web page, wherein the browser component is a mutable data object on the first web page and is coupled to the message bus;
  a second web page having at least one data object coupled to the message bus, wherein the second web page is not generated by the server;
  a memory having computer-executable instructions that provide a manager module coupled to the message bus, the manager module to:
    subscribe the browser component to a topic of a plurality of topics;
    receive, via the message bus, an event that has been published to the topic by a data object on the second web page, the event comprising data that reflects a change of the data object and having an event type that is associated with the topic;
    send, via the message bus, a notification message for the event to subscribers of the topic, including sending the notification message to the browser component, wherein the browser component monitors the message bus for the notification message associated with the event, and wherein the notification message causes at least one of the browser component or the server side component to prepare for receipt of the event; and
    subsequently send the event to the browser component of the first web page via the message bus, wherein the event causes the server side component to be updated; and a controller to execute the instructions.

5. The system of claim 4, wherein the browser component retrieves the event from the manager module in response to receiving the notification message associated with the event.

6. The system of claim 5, wherein the browser component processes the event and data contained in the event.

7. The system of claim 4, wherein the server side component is to publish a selected event to the browser component.

8. The system of claim 7, wherein the browser component is to publish the selected event to the manager module.

9. The system of claim 4, wherein the browser component is to publish a second event to the manager module and send the second event to the server side component.

10. The system of claim 4, wherein the data object on the second web page is to publish a second event to the manager module.

11. A method comprising:
  subscribing, by a computer system, at least one mutable data object on a first web page to a topic of a plurality of topics, wherein the first web page is generated by a first server;
  receiving, by the computer system and via a message bus, an event that has been published to the topic by a browser component of a second web page, the second web page being generated by another server running a server side component associated with the second web page, wherein the event is created by the server side component, and wherein the browser component is a data object on the second web page, the event comprising data that reflects a change of the data object and having an event type that is associated with the topic;
  sending, by the computer system and via the message bus, a notification message for the event to subscribers of the topic, including sending the notification message to the at least one mutable data object, wherein the notification message causes the at least one data object to prepare for receipt of the event, and wherein the at least one mutable data object on the first web page is to monitor the message bus for the notification message associated with the event; and subsequently providing, by the computer system and via the message bus, the event to the at least one mutable data object on the first web page.

12. The method of claim 11, further comprising:

maintaining a list of the plurality of topics associated with events published over the message bus.

* * * * *